(12) United States Patent
Isshiki et al.

(10) Patent No.: US 7,889,625 B2
(45) Date of Patent: Feb. 15, 2011

(54) OPTICAL PICKUP AND OPTICAL DISK DRIVING APPARATUS USING THE SAME

(75) Inventors: Fumio Isshiki, Yokohama (JP); Koichi Hirose, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 232 days.

(21) Appl. No.: 12/334,616

(22) Filed: Dec. 15, 2008

(65) Prior Publication Data

US 2009/0161525 A1 Jun. 25, 2009

(30) Foreign Application Priority Data

Dec. 21, 2007 (JP) .............................. 2007-329497

(51) Int. Cl.
*G11B 7/00* (2006.01)
(52) U.S. Cl. .................................... 369/120; 369/44.41
(58) Field of Classification Search ........................ None
See application file for complete search history.

(56) References Cited

U.S. PATENT DOCUMENTS

| | | | | |
|---|---|---|---|---|
| 4,972,400 A | * | 11/1990 | Kuwabara et al. ......... | 369/44.29 |
| 5,027,337 A | * | 6/1991 | Takahashi et al. ......... | 369/44.26 |
| 5,563,406 A | * | 10/1996 | Durst et al. ............... | 250/208.2 |
| 7,203,138 B2 | * | 4/2007 | Sano et al. ............... | 369/44.26 |
| 2002/0141301 A1 | * | 10/2002 | Ohnishi et al. ........... | 369/44.29 |
| 2004/0085886 A1 | * | 5/2004 | Lee et al. ................ | 369/124.02 |
| 2004/0246834 A1 | * | 12/2004 | Seong ..................... | 369/44.37 |
| 2007/0086311 A1 | * | 4/2007 | Higashiyama et al. ...... | 369/120 |
| 2009/0161525 A1 | * | 6/2009 | Isshiki et al. ............. | 369/275.1 |

FOREIGN PATENT DOCUMENTS

JP 2004-087046 3/2004

* cited by examiner

*Primary Examiner*—Peter Vincent Agustin
(74) *Attorney, Agent, or Firm*—Antonelli, Terry, Stout & Kraus, LLP.

(57) ABSTRACT

An operation mode is arranged to be switched between in recording/reproducing and in adjustment. A switching circuit with a hold circuit therefor is on a light receiving element including an optical pickup having a laser light source emitting a laser beam, an objective lens focusing the laser beam onto a recording layer of a disc, and a light receiving element receiving an optical signal modulated. The light receiving element is operable in an adjustment mode for selecting of the signal of an individual light-receiving surface and for outputting the same. The light receiving element is configured so that the address selection signal line in the adjustment mode may be used also as a sensitivity switching signal line. A compact and highly reliable optical pickup with less signal lines can be provided.

9 Claims, 7 Drawing Sheets

FIG. 5

LIGHT RECEIVING ELEMENT 1

| MODE | SEL3 | SEL2 | SEL1 | SEL0 | OPERATION |
|---|---|---|---|---|---|
| 0: RECORDING/REPRODUCING MODE | 0: INDIVIDUAL A, B, C, OR D | 0: REPRODUCING SENSITIVITY | 0 | 0 | MAXIMUM SENSITIVITY FOR REPRODUCTION |
| | | | 0 | 1 | HIGH SENSITIVITY FOR REPRODUCTION |
| | | | 1 | 0 | MEDIUM SENSITIVITY FOR REPRODUCTION |
| | | | 1 | 1 | LOW SENSITIVITY FOR REPRODUCTION |
| | | 1: RECORDING SENSITIVITY | 0 | 0 | MAXIMUM SENSITIVITY FOR RECORDING |
| | | | 0 | 1 | HIGH SENSITIVITY FOR RECORDING |
| | | | 1 | 0 | MEDIUM SENSITIVITY FOR RECORDING |
| | | | 1 | 1 | LOW SENSITIVITY FOR RECORDING |
| | 1: A TOTAL SUM OF A, B, C, AND D | 0: REPRODUCING SENSITIVITY | 0 | 0 | MAXIMUM SENSITIVITY FOR REPRODUCTION |
| | | | 0 | 1 | HIGH SENSITIVITY FOR REPRODUCTION |
| | | | 1 | 0 | MEDIUM SENSITIVITY FOR REPRODUCTION |
| | | | 1 | 1 | LOW SENSITIVITY FOR REPRODUCTION |
| | | 1: RECORDING SENSITIVITY | 0 | 0 | MAXIMUM SENSITIVITY FOR RECORDING |
| | | | 0 | 1 | HIGH SENSITIVITY FOR RECORDING |
| | | | 1 | 0 | MEDIUM SENSITIVITY FOR RECORDING |
| | | | 1 | 1 | LOW SENSITIVITY FOR RECORDING |
| 1: ADJUSTMENT MODE | 0 | 0 | 0 | 0 | E1 SELECTED OUTPUT |
| | 0 | 0 | 0 | 1 | E2 SELECTED OUTPUT |
| | 0 | 0 | 1 | 0 | E3 SELECTED OUTPUT |
| | 0 | 0 | 1 | 1 | E4 SELECTED OUTPUT |
| | 0 | 1 | 0 | 0 | F1 SELECTED OUTPUT |
| | 0 | 1 | 0 | 1 | F2 SELECTED OUTPUT |
| | 0 | 1 | 1 | 0 | F3 SELECTED OUTPUT |
| | 0 | 1 | 1 | 1 | F4 SELECTED OUTPUT |
| | 1 | 0 | 0 | 0 | a SELECTED OUTPUT |
| | 1 | 0 | 0 | 1 | b SELECTED OUTPUT |
| | 1 | 0 | 1 | 0 | c SELECTED OUTPUT |
| | 1 | 0 | 1 | 1 | d SELECTED OUTPUT |
| | 1 | 1 | 0 | 0 | e14 SELECTED OUTPUT |
| | 1 | 1 | 0 | 1 | e23 SELECTED OUTPUT |
| | 1 | 1 | 1 | 0 | f14 SELECTED OUTPUT |
| | 1 | 1 | 1 | 1 | f23 SELECTED OUTPUT |

FIG. 7

LIGHT RECEIVING ELEMENT 2

| MODE | SEL3 | SEL2 | SEL1 | SEL0 | OPERATION |
|---|---|---|---|---|---|
| 0: RECORDING/ REPRODUCING MODE | X (N/A) | 0: REPRODUCING SENSITIVITY | 0 | 0 | MAXIMUM SENSITIVITY FOR REPRODUCTION |
| | | | 0 | 1 | HIGH SENSITIVITY FOR REPRODUCTION |
| | | | 1 | 0 | MEDIUM SENSITIVITY FOR REPRODUCTION |
| | | | 1 | 1 | LOW SENSITIVITY FOR REPRODUCTION |
| | | 1: RECORDING SENSITIVITY | 0 | 0 | MAXIMUM SENSITIVITY FOR RECORDING |
| | | | 0 | 1 | HIGH SENSITIVITY FOR RECORDING |
| | | | 1 | 0 | MEDIUM SENSITIVITY FOR RECORDING |
| | | | 1 | 1 | LOW SENSITIVITY FOR RECORDING |
| 1: ADJUSTMENT MODE | X | 0 | 0 | 0 | E1 SELECTED OUTPUT |
| | X | 0 | 0 | 1 | E2 SELECTED OUTPUT |
| | X | 0 | 1 | 0 | E3 SELECTED OUTPUT |
| | X | 0 | 1 | 1 | E4 SELECTED OUTPUT |
| | X | 1 | 0 | 0 | F1 SELECTED OUTPUT |
| | X | 1 | 0 | 1 | F2 SELECTED OUTPUT |
| | X | 1 | 1 | 0 | F3 SELECTED OUTPUT |
| | X | 1 | 1 | 1 | F4 SELECTED OUTPUT |

FIG. 8

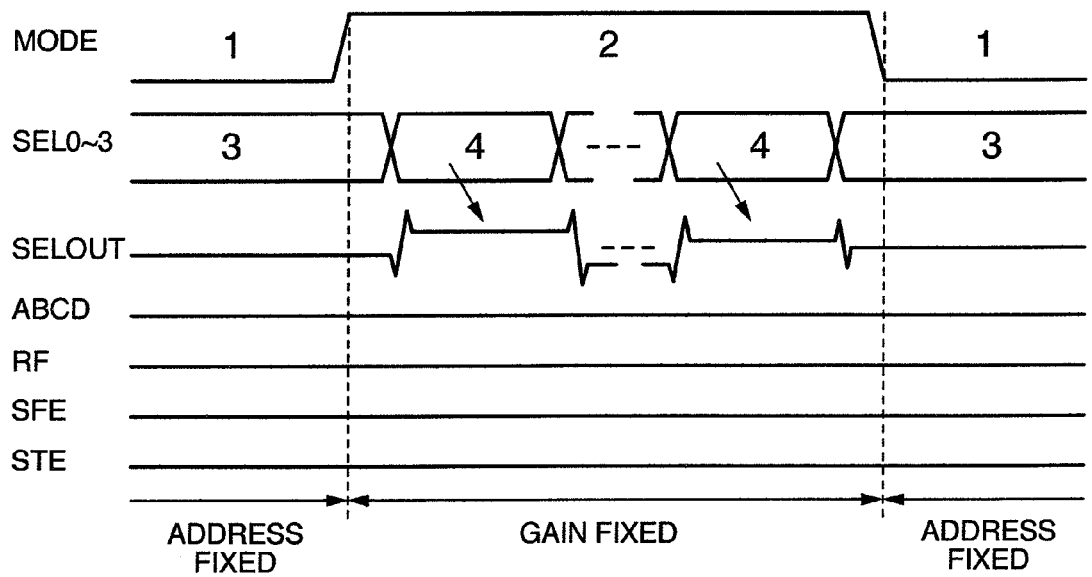

OPTICAL PICKUP AND OPTICAL DISK DRIVING APPARATUS USING THE SAME

INCORPORATION BY REFERENCE

The present application claims priority from Japanese application JP 2007-329497 filed on Dec. 21, 2007, the content of which is hereby incorporated by reference into this application.

BACKGROUND

The present invention relates to a reproducing optical head for an optical disc. More specifically, the present invention relates to an optical pickup for an optical information recorder, a multilayer optical pickup corresponding to multiple layers, and a multiple-standards compatible optical pickup.

Reduction in the number of signal lines has been a subject in order to miniaturize the optical pickup.

For example, as described in JP-A-2004-87046, a pickup has been proposed, in which the number of signal lines is reduced by carrying out analog-to-digital conversion on the pickup and then carrying out time-division serial transmission.

Such reduction in the number of signal lines has been an important subject in order to reduce cost in the sophisticated and multiple-standards compatible optical pickup having a plurality of light receiving elements mounted therein.

SUMMARY

For example, use of digital transmission as in JP-A-2004-87046 for the purpose of reduction of the number of signal lines causes such problem that digital noise is generated by digital circuits for analog-to-digital conversion (A/D conversion) and the like. Mixing of digital noise into the reproduced signal degrades the signal quality, resulting in difficulties in accurate decoding. Moreover, an AD converter needs to be mounted, and a number of countermeasures in terms of the implementation and the circuitry are required, thereby increasing the cost. Moreover, in the digital transmission, mixing of digital noise into other signal lines will also occur during transmission.

The present invention has been made in view of such actual circumstances. It is, therefore, an object of the present invention to provide a compact and highly reliable optical pickup capable of reducing the number of signal lines.

The above object can be achieved by the inventions described in the claims.

The overview of a representative one among the inventions disclosed in the present application is described briefly as follows. An optical pickup according to the present invention comprises a laser light source which emits a laser beam, an objective lens which focuses the laser beam onto a recording layer of an optical disc, and a light receiving element which receives an optical signal modulated by the recording layer. The light receiving element is provided with an adjustment mode capable of making address selection of the signal of an individual light-receiving surface and outputting the same, and includes a sensitivity switching signal line and a switching signal line for switching to the adjustment mode. The light receiving element is configured so that the address selection signal line of an individual light-receiving surface in the adjustment mode may be used also as the sensitivity switching signal line.]

According to the present invention, the number of signal lines can be reduced and a compact optical pickup can be provided.

BRIEF DESCRIPTION OF THE DRAWING

These and other features, objects and advantages of the present invention will become more apparent from the following description when taken in conjunction with the accompanying drawings wherein:

FIG. 5 is an example of the operation switching in response to an input signal of the light receiving element, according to the present invention;

FIG. 7 is an example of the operation switching in response to the input signal of a second light receiving element according to the present invention; and FIG. 8 is an example of the operation switching of the light receiving element and the changes in input/output signals, according to the present invention.

DETAILED DESCRIPTION OF THE EMBODIMENTS

Figure 1:
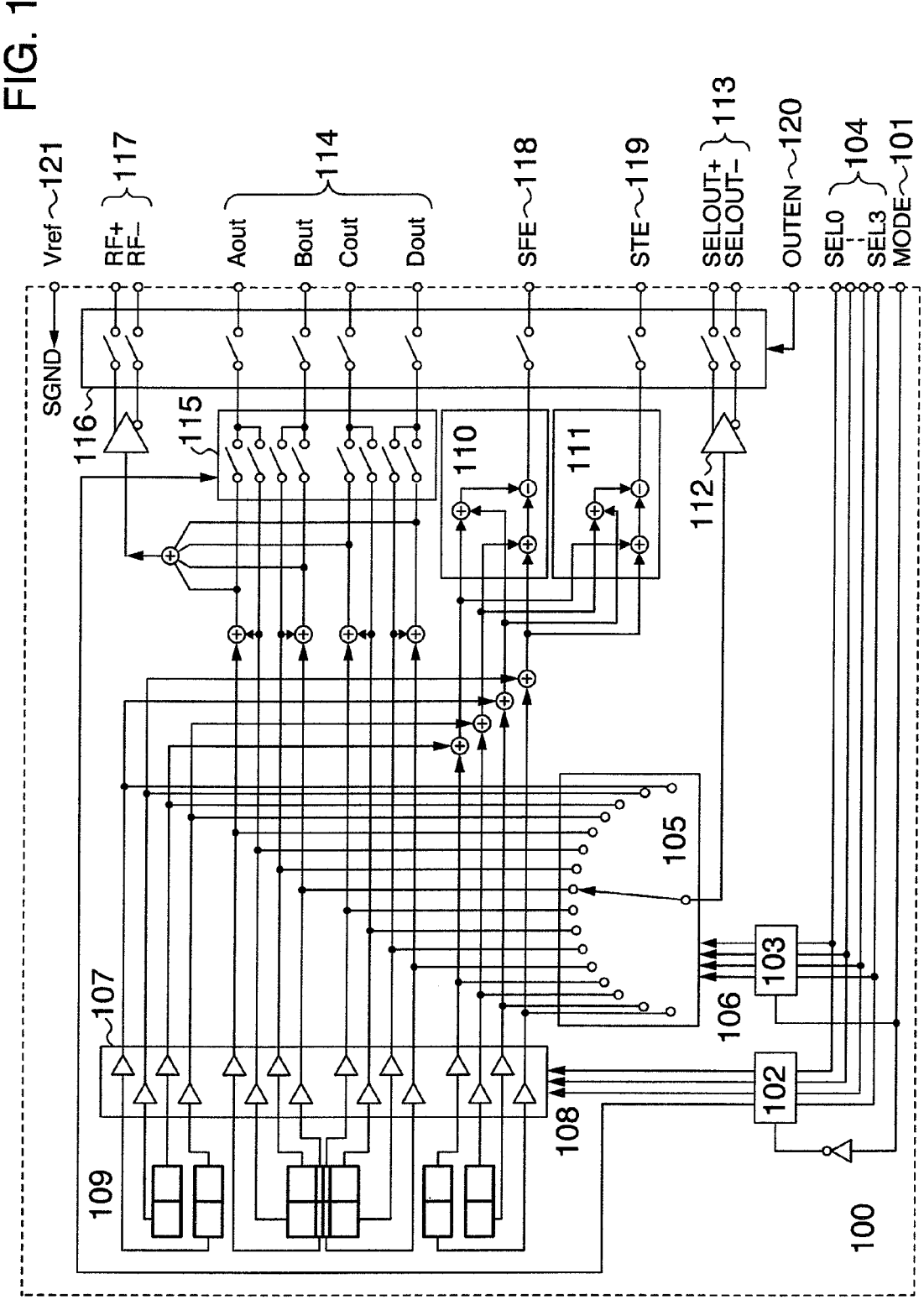
FIG. 1 is a configuration example of a light receiving element mounted on an optical pickup according to the present invention.

Hereinafter, an optical pickup according to the present invention will be described in detail using the accompanying drawings. The optical pickup device in the following embodiments employs a method of directly transmitting analog signals by address selection, as the transmission method. Then, the optical pickup device is configured so as to be able to reduce the number of signal lines, and switch between a reproduction mode and an adjustment mode by a signal line, and make address selection of the light intensity signal of an individual light-receiving surface in the adjustment mode.

The embodiments of the present invention will be described using FIG. 1 to FIG. 8 in Embodiment 1 and Embodiment 2 below. For ease of understanding, in each of the drawings, parts exhibiting the same effect are partly given the same reference numerals for illustration.

Embodiment 1

Configuration and Signal Input/Output of the Light Receiving Element

The details of the light receiving element of an optical pickup according to the present invention is described using FIG. 1 to FIG. 5.

Figure 3:
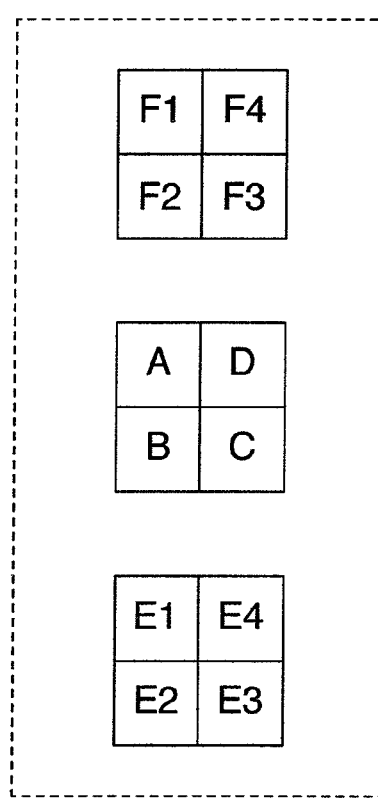
FIG. 3 is a view for illustrating an example of the light-receiving surface pattern on a light receiving element.
Figure 4:
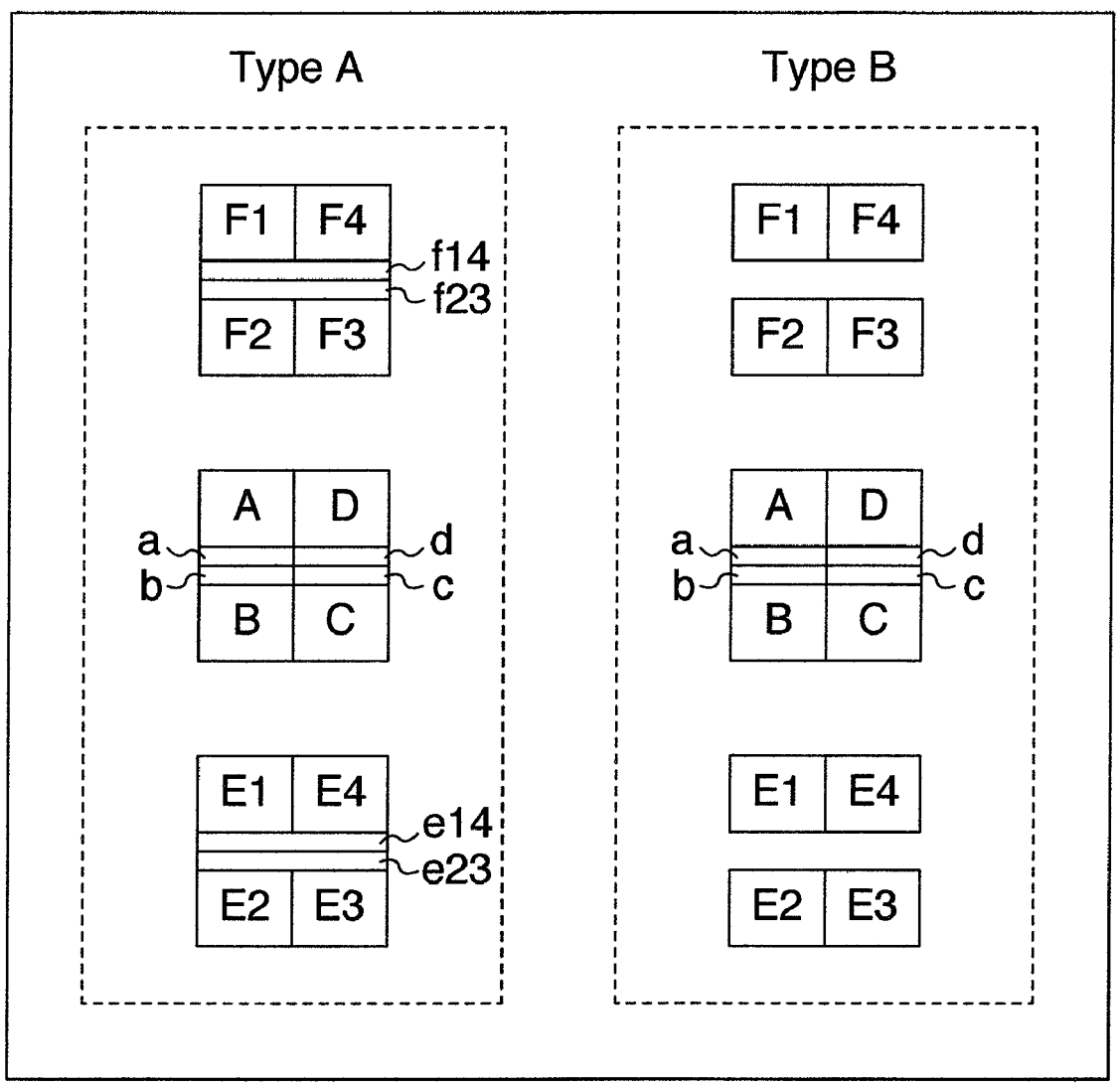
FIG. 4 is an example of the light-receiving surface pattern of the light receiving element used in the present invention.

First, the configuration of the light-receiving surface is described using FIG. 3 and FIG. 4.

For the light-receiving surface of a light receiving element of an optical pickup according to the present invention, the number of light-receiving surfaces tends to increase due to the countermeasure against the stray light of the multilayer optical disc. During the recording/reproduction of the multilayer optical disc, unfocused light is reflected and returned by the adjacent layer of a layer being recorded-reproduced, and this light serves as the stray light and disturbs the optical signal on the light receiving element. In order to prevent this, the light-receiving surface on the light receiving element needs to be devised so as to remove the influence of the stray light.

The configuration of the light-receiving surface of the light receiving element employing such a devisal, in the case of the configuration using a three-spot method, changes from the configuration of the light-receiving surfaces as shown in FIG. 3 to the configuration of the sub spot receiving surface having 4 surfaces×2 (=8 surfaces) and the main spot receiving surface having 6 surfaces, resulting in a total number of partitions of 14 or more as shown in FIG. 4, for example. Since the light receiving element has a number of light-receiving surfaces, if all the individual light-receiving surface signals are output from the light receiving element, then the pin counts thereof tends to exceed the limit of the pin count of the light receiving element mountable on the optical pickup. For this reason, usually, the number of signal lines is reduced by outputting signals which are internally wire-connected or added together so as to be able to generate servo signals such as a focus signal or a tracking signal. However, in order to accommodate new multilayer discs, the number of light-receiving surfaces has been increasing further and the number of signal lines has been increasing.

If the signal of an individual light-receiving surface cannot be detected, not only the assembling and adjustment in manufacturing the optical pickup becomes difficult but also the servo adjustment becomes difficult after mounting the drive.

Figure 2:
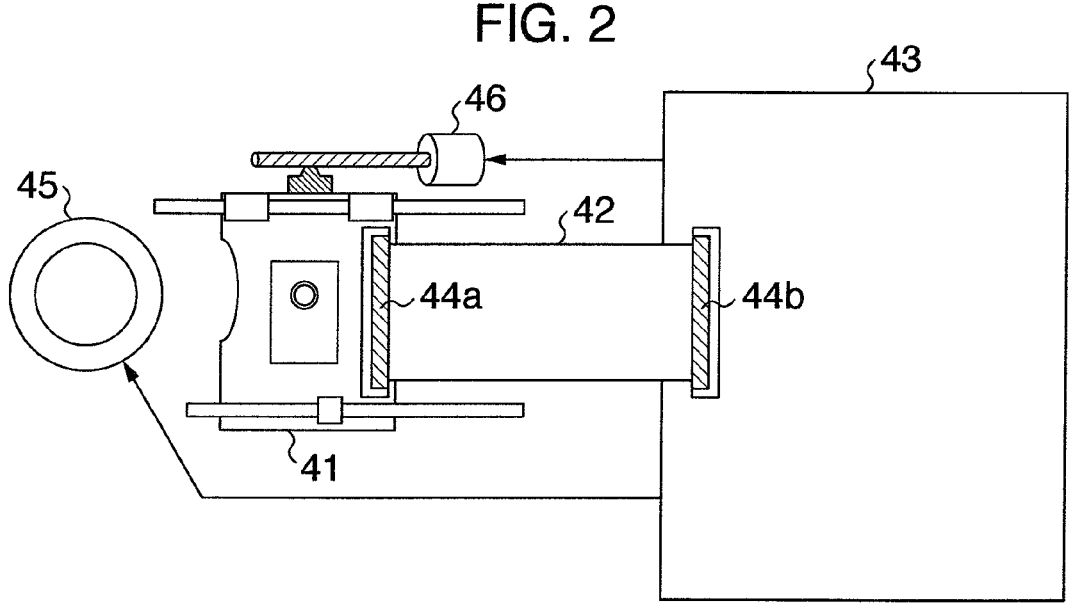
FIG. 2 is an explanatory view of a configuration example of the mechanical system of an optical information reproducing device.

Moreover, if the number of signal lines increases, the number of terminals for connecting signal lines to the outside from the optical pickup needs to be increased. An example of the configuration of the optical disc apparatus is as shown in FIG. 2. An optical pickup 41 is connected to a main control board 43 via a connector 44a, a flexible cable 42 (flat cable), and a connector 44b. The main control board 43 rotates an optical disc medium by means of a spindle motor 45, and also controls a feed motor 46 to drive the optical pickup 41 in the radial direction. In this case, the width of the flexible cable 42 is restricted to the size of the connector 44a mountable on the pickup, however, the size of the connector is reaching a limit of the size of the circuit board mountable on the optical pickup. Therefore, in most cases the number of signal lines cannot be increased any more. Moreover, if the number of terminals is increased further, the contact reliability of the connector may degrade.

This is becoming a big problem in the multilayer and multi-standards compatible optical pickup in recent years.

In order to solve this problem, a method of reducing the number of signal lines by employing digital transmission has been proposed, as in JP-A-2004-87046. However, in the digital transmission, digital noise will be generated by mounting an AD converter on the optical pickup. The optical pickup in recent years has a low reproduced light intensity due to a small light spot using a blue light, and is sensitive to noise caused by high multiple-speed compatible reproduction. Accordingly, when it goes digital, the noise prevention cost is high.

Then, in the present invention, an analog transmission method has been devised to reduce the number of signal lines suitable for the optical disc.

The features of the light receiving element for which the actual countermeasure has been taken will be described using FIG. 1 and FIG. 5.

In this configuration, in addition to a "recording/reproducing mode" used for normal operation, an "adjustment mode" capable of making address selection of the signal of an individual light-receiving surface and outputting the same is provided so as to allow for mode switching by a signal line. The normal operation requiring a low noise and excellent reproduced signal is carried out in the "recording/reproducing mode". On the other hand, when the individual signal of a sub spot receiving surface or the like needs to be detected for adjustment or the like, the detection is carried out using the "adjustment mode" capable of making address selection of an individual signal from multiple light-receiving surfaces and outputting the same. The address selection is fixed in the recording/reproducing mode while in the adjustment mode, the sensitivity is fixed. This allows the address selection line and the sensitivity switching signal line to be combined. Here, the light-receiving surface signal can be individually detected without causing difficulty in the servo operation as the optical disc. In the present invention, these "recording/reproducing mode" and "adjustment mode" can be switched by a signal line.

In the adjustment mode, instead of fixing the sensitivity (gain), the address selection is made from a signal line so as to allow for the signal selection of an individual light-receiving surface. This adjustment mode is referred to as a first mode. On the other hand, in the recording/reproducing mode, instead of fixing the signal selection of an individual light-receiving surface, the sensitivity switching is carried out from a signal line so as to allow for the sensitivity (gain) switching during recording or during reproducing. This recording/reproducing mode is referred to as a second mode.

By combining the above-described two sets of selection signal lines on the terminals, the number of terminals or the number of signal lines can be reduced and the flexibility in both the sensitivity adjustment and the detection of an individual light-receiving surface signal can be increased without degrading the performance required for the recording/reproducing operation and the setup operation.

In addition, hereinafter, the recording/reproducing mode is also referred to as simply a reproducing mode to combine the both recording and reproducing. Moreover, the switching signal line which switches the operation mode to the adjustment mode is referred to as the "switching signal line for switching to the adjustment mode" or the "operation mode switching signal line".

The signal lines, the circuit configuration, and the specific operations thereof will be described below.

First, the signal lines, the circuit configuration, and the specific signal flow are described in conjunction with FIG. 1 below.

FIG. 1 shows an internal circuit configuration of a light receiving element 100 being mounted on an optical pickup. The entire operation of the light receiving element is switched to the "recording/reproducing mode" or the "adjustment mode" using an operation mode switching signal line 101 (MODE). The light receiving element includes two latch circuits 102 and 103. In the adjustment mode, a selector 105 is switched in response to the input value of a common switching signal line 104 so that a desired light-receiving surface signal may be selected and output. A light-receiving surface selection signal 106 output by the latch circuit 103 controls the selector 105. Moreover, in the recording/reproducing mode, the sensitivity (amplification factor: Gain) of a photocurrent amplifier 107 is switched in response to the input value of the common switching signal line 104. A sensitivity switching signal 108 output by the latch circuit 102 controls the sensitivity of the photocurrent amplifier 107.

Specifically, the operation mode switching signal line 101 (MODE) controls the tracking and holding of two latch circuits 102 and 103. The sensitivity switching signal 108, which is the output of the latch circuit 102, will follow the input value of the common switching signal line 104 when MODE=0, while when MODE=1, the input value at the time when lastly MODE=0 will be held (latched). In contrast, the light-receiving surface selection signal 106, which is the output of the latch circuit 103, will follow the input value of the common switching signal line 104 when MODE=1, while when MODE=0, the input value at the time when lastly MODE=1 will be held (latched). These holding functions allow for the operation of switching to the adjustment mode during the reproducing operation, and the signal of the common switching signal line 104 can be used both for the sensitivity switching and the light-receiving surface selection.

This light receiving element comprises a sub focus error signal generating circuit 110, the sub focus error signal being generated from the sub spot receiving surface, and a sub tracking error signal generating circuit 111, and can output the calculated sub focus error signal and sub tracking error signal.

Hereinafter, the description on the operation of the remaining parts is continued.

The photocurrent amplifier 107 amplifies the light intensity signal detected on each light-receiving surface 109 at an amplification factor corresponding to the sensitivity. This signal is added and subtracted, and is then output from a main spot receiving signal 114 (Aout/Bout/Cout/Dout), a reproduced signal output 117 (RF+/RF−), a sub focus error signal output 118 (SFE), and a sub tracking error signal output 119 (STE). Moreover, the light-receiving surface signal selected by the selector 105 is differentially amplified by a differential amplifier 112 and is then output from a selected light-receiving surface signal output 113. Note that a reproduced signal output 117 is also a differential output which has been amplified by a differential amplifier 116.

Note that all these output signals can be switched simultaneously to be output or to be put into a high-impedance state by stopping the output, by means of a light-receiving element output enable signal 120 (OUTEN). Moreover, an output reference voltage (signal ground (SGND)) serving as the zero point of these signal outputs when there is no light can be input from a reference voltage input terminal 121 (Vref).

Moreover, in the recording/reproducing mode, the signal can be switched and output to Aout by means of a main spot signal switch 115 in such a way that when SEL3=0 the signal of a light-receiving surface A is directly output to Aout, while when SEL3=1 the summed signals of the light-receiving surface "A" and of the light-receiving surface "a" is output to Aout. The same is true of Bout/Cout/Dout. Accordingly, also in the light-receiving surfaces taking the countermeasure for multilayer discs as shown in FIG. 4, when you want to switch between the differential push pull (DPP) method and the differential phase detection (DPD) method for use, these methods can be switched so as to obtain the ideal signals, respectively.

Moreover, in this configuration example, the selected light-receiving surface signal output 113 is provided in the form of a differential output, however, actually, if an adequate performance on noise is obtained, the direct output is possible without the differential amplifier 112.

Configuring the circuit as described above, the pin count can be settled within 18 pins including the power supply terminals (+/−) while allowing the signals of 16 light-receiving surfaces to be detected individually, and the light receiving element 100 can be mounted also on a slim type pickup.

Next, the operation of the light receiving element is described using FIG. 5.

In the recording/reproducing mode, the sensitivity (gain) can be switched by the sensitivity switching signal line at any time in accordance with each optical disc medium. This is indispensable because the focus or tracking servo will run out of control during switching unless the luminescence intensity of a laser and the sensitivity of the light receiving element are switched at high speed in a synchronous manner when switching between recording and reproducing. Moreover, it is important that noise is not generated during recording/reproducing, and thus the control, such as the switching of an individual light-receiving surface, which may generate switching noise is preferably locked. For this reason, the address selection is fixed in the recording/reproducing mode.

In the adjustment mode, the individual signal of each light-receiving surface is selected and output by address selection. This can reduce the number of individual signal output lines. In the adjustment mode, unlike during recording/reproducing, noise can be generated. However, in order to know the states of a number of light-receiving surfaces as real-time as possible, a capability of high-speed tracking and scanning in response to a change in the address selection is required. Moreover, in order to compare the signal of each light-receiving surface under the same condition, the sensitivity is preferably constant. For this reason, the sensitivity (gain) is fixed in the adjustment mode.

The light receiving element of the optical pickup of this configuration complements the requirements and characteristics of these two modes.

A relationship between the specific switching signal input and selected signal output is shown in FIG. 5. Each shows a relationship among the input signal supplied to the light receiving element input, the sensitivity switching, and the switching of a light-receiving surface signal to be selected and output. The operation has five features as follows.

(1) The operation mode switching signal switches the operation of the light receiving element between in the "recording/reproducing mode" and in the "adjustment mode".

(2) In the "recording/reproducing mode", the sensitivity of the whole light receiving element will switch in response to inputs SEL0 to SEL3.

(3) In the "adjustment mode", signals to be selected and output to the selected signal output terminal (SELOUT) will switch in response to the inputs SEL0 to SEL3.

(4) When moving from the recording/reproducing mode to the adjustment mode, the sensitivity specified lastly by SEL0 to SEL3 will be held.

(5) When moving from the adjustment mode to the recording/reproducing mode, the light-receiving surface specified lastly by SEL0 to SEL3 will be held.

The specific changes in these signals are as shown in FIG. 8. When the signal of the operation mode switching signal line (MODE) switches from the recording/reproducing mode 1 to the adjustment mode 2, the sensitivity of the sensitivity switching signal 3 which has been input onto the common switching signal line (SEL0 to SEL3) until just previously will be held during the adjustment mode. After switching to the adjustment mode, the signal of a desired light-receiving surface can be extracted and output to the selected signal output terminal (SELOUT) by inputting a light-receiving surface selection signal 4 onto the common switching signal line (SEL0 to SEL3). During this period, the main spot receiving signal 114 (Aout/Bout/Cout/Dout), the reproduced signal output 117 (RF+/RF−), the sub focus error signal output 118 (SFE), or the sub tracking error signal output 119 (STE) will continue completely the same operation as that during the recording/reproducing mode, also during the adjustment mode. As a result, the signal of the common switching signal line 104 can be used also for the sensitivity switching/light-receiving surface selection, with the focus servo or tracking servo being applied.

As a result, even if six light-receiving surfaces are added, the pin count is settled with the same pin count as the conventional one, and the signal of an individual light-receiving surface can be extracted with the focus servo or tracking servo being applied, and therefore the adjustment becomes easy.

The adjustment mode can be used not only in manufacturing (assembling) the pickup but also in carrying out initial learning or servo adjustment of a disc on the drive and the reliability of the servo adjustment can be improved on the drive, and therefore, the reliability of the whole driving unit will also be improved and the failure analysis becomes easy.

In order to realize the above-described operation, the light receiving element includes a switching signal line (switching signal line for switching to the adjustment mode) for the adjustment mode and the recording/reproducing mode, whereby during the adjustment (assembly adjustment/servo adjustment) mode, the address selection is made using the switching signal line, and the individual signal of each light-receiving surface is output in an analog manner. In this case, the sensitivity (gain) is held or is fixed to a constant value. Moreover, each light receiving element includes a light receiving element switching signal line (output enable/sleep switching signal line) so that the number of signal lines can be reduced by connecting a plurality of light receiving elements in parallel to each other and sharing the signal lines. Note that, by setting the output of the signal of each individual light-receiving surface to a differential output, the noise associated with the scanning by high-speed address selection switching can be reduced further. Moreover, in the case of mounting two light receiving elements, if the light receiving elements are fabricated such that under a condition where one of the light receiving elements is output-enabled, the other light receiving element goes into a sleep mode, then two output enable/sleep switching signal lines can be combined as one light receiving element selection signal line, and the number of signal lines of the flexible cable 42 can be reduced.

Figure 9:
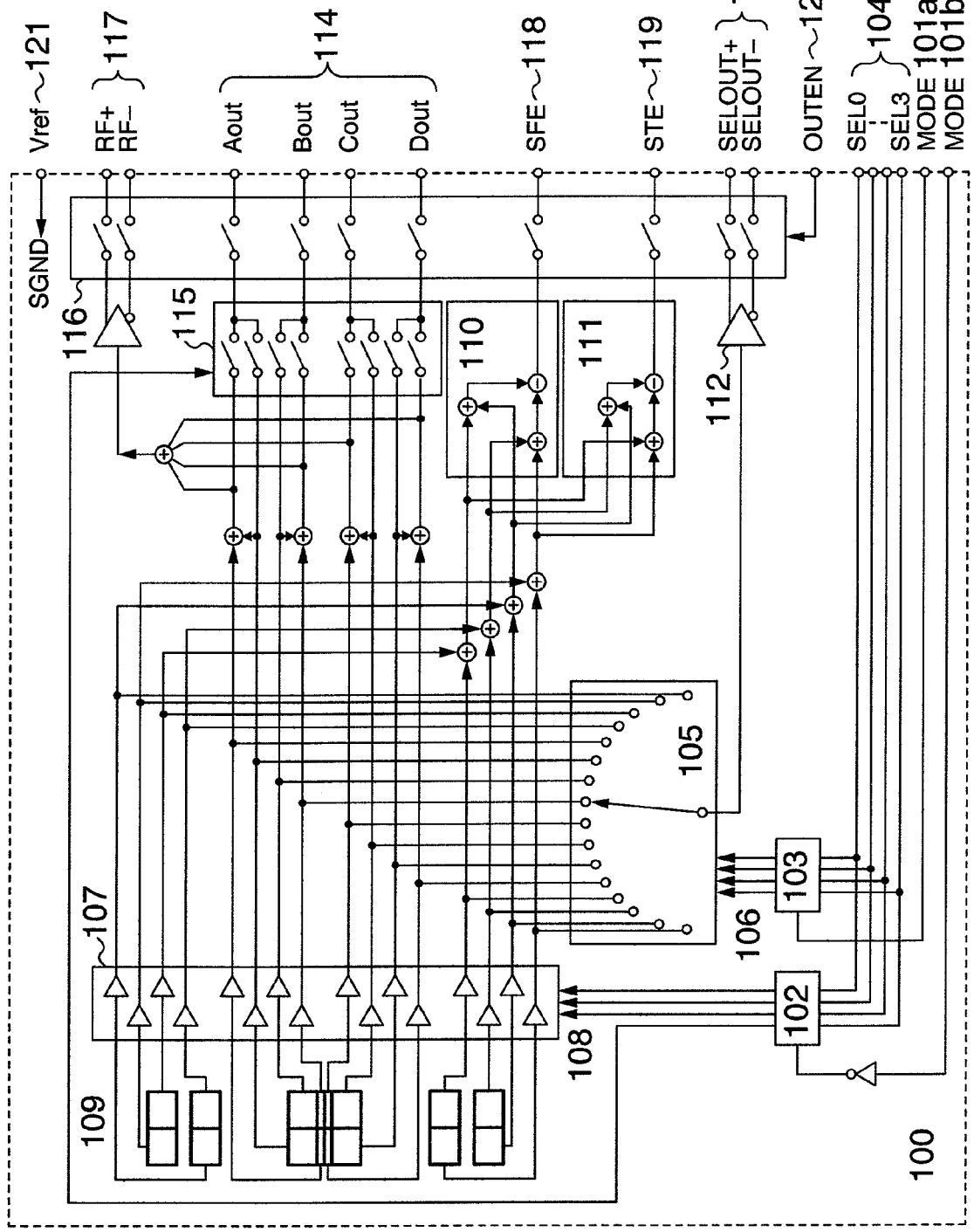
FIG. 9 shows an example of a configuration of a light receiving element mounted on an optical pickup according to the present invention, in which an operation mode switching signal line is divided into two signal lines and a pair of mode switching signal lines is provided.

Note that, in the above-described configuration, the switching signal lines for the adjustment mode and for the recording/reproducing mode are combined as one signal line, however, even if the portion corresponding to the operation mode switching signal line 101 in FIG. 1 is divided into two operation mode switching signal lines 101*a* and 101*b* as shown in FIG. 9 and the operation modes are switched using two mode switching lines as one set, the basic effect of the present invention will not change. In this case, a case where the sensitivity is fixed by provided the same signal of "1" to two operation mode switching signal lines 101*a* and 101*b* corresponds to the above-described adjustment mode. Note that, in the case where the operation mode switching signal line is divided into two in this way, the number of signal lines will increase by one, however, the flexibility of control can be improved, such as that the light-receiving surfaces can be selected and switched even during recording/reproducing or that the sensitivity can be switched even during adjustment.

Moreover, in this configuration, as common between in the recording/reproducing mode and in the adjustment mode, the focus error signal (hereinafter, referred to as the sub focus error signal or SFE signal) generated in the sub spot receiving surface and the tracking error signal (hereinafter, referred to as the sub tracking error signal or STE signal) generated in the sub spot receiving surface are calculated in an operational circuit inside the light receiving element and are then directly output from then SFE terminal and the STE terminal, respectively. Since the calculation is already done, the number of signal lines can be reduced.

That is, in this configuration, a laser, an objective lens for focusing the laser beam onto the recording layer of an optical disc, and a light receiving element which receives an optical signal modulated by the recording layer are provided, wherein the light receiving element is provided with the adjustment mode capable of making address selection of the signal of an individual light-receiving surface and outputting the same, a sensitivity switching signal line, and a switching signal line for switching to the adjustment mode, and wherein the address selection signal line and the sensitivity switching signal line are combined. Accordingly, even if the number of signal lines is reduced, the light intensity signal of an individual light-receiving surface can be obtained individually during the adjustment mode with the focus servo and the tracking servo being applied, thereby simplifying the assembly and servo adjustment. Moreover, also in the operation on the drive, an optical disc apparatus capable of switching to the optimum servo control in response to a change in the light intensity distribution on a light-receiving surface can be configured. For example, an optical disc apparatus can be configured, which stabilizes the control by automatically switching the servo mode from the three-spot method to the differential phase detection method (DPD method) when the influence from stray light is extremely large. Moreover, using a multilayer compatible pickup, the number of light-receiving surfaces of which has been increased due to stray light preventing light-receiving surfaces, the optical pickup can be miniaturized by reducing the number of signal lines. Moreover, since noise will not appear in the normal operation (operation mode), excellent noise characteristic can be obtained in a multilayer disc or during high multiple-speed reproduction with severe noise requirement.

Moreover, this configuration includes a holding function (i.e., a latch circuit) to hold the sensitivity setting before switching, as it is, when switching to the adjustment mode by the mode switching signal line. This allows the input switching signal line to be used also as the sensitivity switching line also when switching between the recording/reproducing mode and the adjustment mode. While holding the sensitivity corresponding to each optical disc standard, the signal of an individual light-receiving surface can be obtained in the adjustment mode and the light intensity distribution on the light-receiving surface can be checked. Since the servo can be adjusted to the optimum condition in accordance with each optical disc, the servo control can be stabilized.

In particular, in a pickup using the three-spot method in the multilayer optical disc, a light receiving element having no less than 14 light-receiving surfaces may be required as in this embodiment (16 surfaces) in order to suppress the influence of scattered light (stray light) from the adjacent recording layer. Also in such a configuration, after housing the light receiving element in a light receiving element package having no more than 18 pins which can be usually readily soldered, the signal of an individual light-receiving surface can be extracted. In reproducing a multilayer optical disc, the tracking error signal can be precisely obtained by suppressing the influence of scattered light (stray light) from the adjacent recording layer on the light receiving element. Since the performance can be improved by adding multilayer light-receiving surfaces used for removing stray light, the servo can be stabilized (reliability will be improved). Moreover, since the fabrication (adjustment) of a pickup becomes easy even if the number of light-receiving surfaces is increased, the cost can be reduced.

Moreover, in this configuration, a configuration for switching to the maximum or quasi-maximum fixed sensitivity when switching to the adjustment mode by the mode switching signal line may be also employed. In this case, with such laser intensity that will not damage the disc in the adjustment mode, the light intensity signal of an individual light-receiving surface can be obtained and the light intensity distribution on the light-receiving surface can be checked. Accordingly, the disc damage associated with the mode switching can be prevented and the reliability can be improved. Moreover, in this configuration, there is provided a terminal for differentially outputting the output signal of an individual light-receiving surface which is output by address selection. Since diffracted light is typically used in the sub spot receiving surface, the light intensity is low and the sensitivity (gain) of the light-receiving surface is high. Accordingly, light signal bouncing is likely to occur in terms of circuitry. The differential output can suppress the generation of noise associated with the address selection switching, and can prevent signal fluctuation (noise generation) during switching, and allows for output switching at a high frequency. Accordingly, high real-time scanning can be carried out. Moreover, since the high speed switching will not produce noise into other signals, a reliable optical disc apparatus which prevents the disturbance in servo due to the switching especially during high multiple-speed recording or reproducing can be configured.

Moreover, in this configuration, although the selection signal lines of multiple light receiving elements have independent terminals, these selection signal lines may be used also as the address selection lines of the light-receiving surfaces. In this case, as the address selection line, the selection signal line of a light receiving element or the output enable/sleep switching signal line can be also used, so the number of signal lines can be reduced further.

Moreover, in this configuration, the operational circuit which calculates the sub tracking error signal and the sub focus error signal is provided inside the light receiving element. As a result, the tracking error signal and sub focus error signal of the sub light-receiving surface can be calculated in advance and be output. Accordingly, the originally-required four signal outputs of the sub spot receiving surface can be reducing to two signal outputs of the SFE terminal and the STE terminal. That is, the number of signal lines can be reduced and the cost can be reduced.

Moreover, in this configuration, not only in the recording/reproducing mode but also in the adjustment mode, the terminals are made independent from each other so that the sub focus error signal and the sub tracking error signal may be continuously output. This allows the focus and tracking servo control to be maintained as it is also when switching from the recording/reproducing mode to the adjustment mode. Accordingly, a change in the light intensity that may cause a servo problem can be detected with the servo being applied, and the cause thereof can be investigated. Moreover, the servo adjustment can be made reliable by avoiding the adjustment which makes the servo control unstable on the drive.

Note that, in this configuration, the sensitivity switching signal line includes the recording/reproducing switching signal line. By combining the recording/reproducing switching signal line and the address selection signal line, the number of signal lines can be reduced further.

Moreover, in this configuration, in the adjustment mode, the signal of a divided light-receiving surface on the main spot also can be output using the address selection signal line. This increases the change ratio of the light intensity signal due to a shift in the light-receiving surface of the main spot. Accordingly, a shift in the light-receiving surface can be detected accurately, thereby achieving high precision adjustment.

As described above, in the present invention, a multilayer/multi-standards compatible optical pickup is provided with an adjustment mode (a first mode) capable of making address selection of the signal of an individual light-receiving surface, instead of fixing the sensitivity (gain), and outputting the same, and a recording/reproducing mode (a second mode) capable of switching the sensitivity (gain) instead of fixing the signal selection of an individual light-receiving surface. Here, an address selection signal line for making address selection of the signal of an individual light-receiving surface, and a sensitivity switching signal line (including a recording/reproducing switching signal line) are used in common between the both modes, and thereby the signals of the sub spot/main spot receiving surfaces can be obtained individually while reducing the number of signal lines, and the reliability in the assembly adjustment/servo adjustment of an optical pickup can be improved. In the recording/reproducing mode, the sensitivity is instantaneously switched by the sensitivity switching signal, while in the adjustment mode, an individual light-receiving surface signal used for a sub spot is selected and output by the address selection signal. Accordingly, a low noise optical pickup capable of detecting the individual light-receiving surface signal while reducing the number of signal lines can be provided. Note that this configuration has lower circuit noise generated during switching as compared with the so-called serial communication method using a shift register, because a clock synchronization type digital circuit (serial-parallel conversion) for communication is not required. Moreover, since the serial-parallel conversion is not required, the circuitry can be produced easily at low cost only by using analog circuits.

Note that, in this configuration example, as an example, the main spot receiving surface is divided into 8 and the sub spot light-receiving surface is divided into 4×2 (upper and lower sides), however, in an arbitrary configuration in which the main spot receiving surface is divided into 4 to 10 and the sub spot receiving surface is divided into (2 to 8)×2 (upper and lower sides), the advantage of the present invention can be obtained in a similar manner.

Embodiment 2

Overall Configuration of an Information Reproduction Apparatus

Hereinafter, an example of an embodiment of the overall configuration of an information reproduction apparatus having an optical pickup using the light receiving element of Embodiment 1 according to the present invention will be described using FIG. 6 to FIG. 8.

Figure 6:
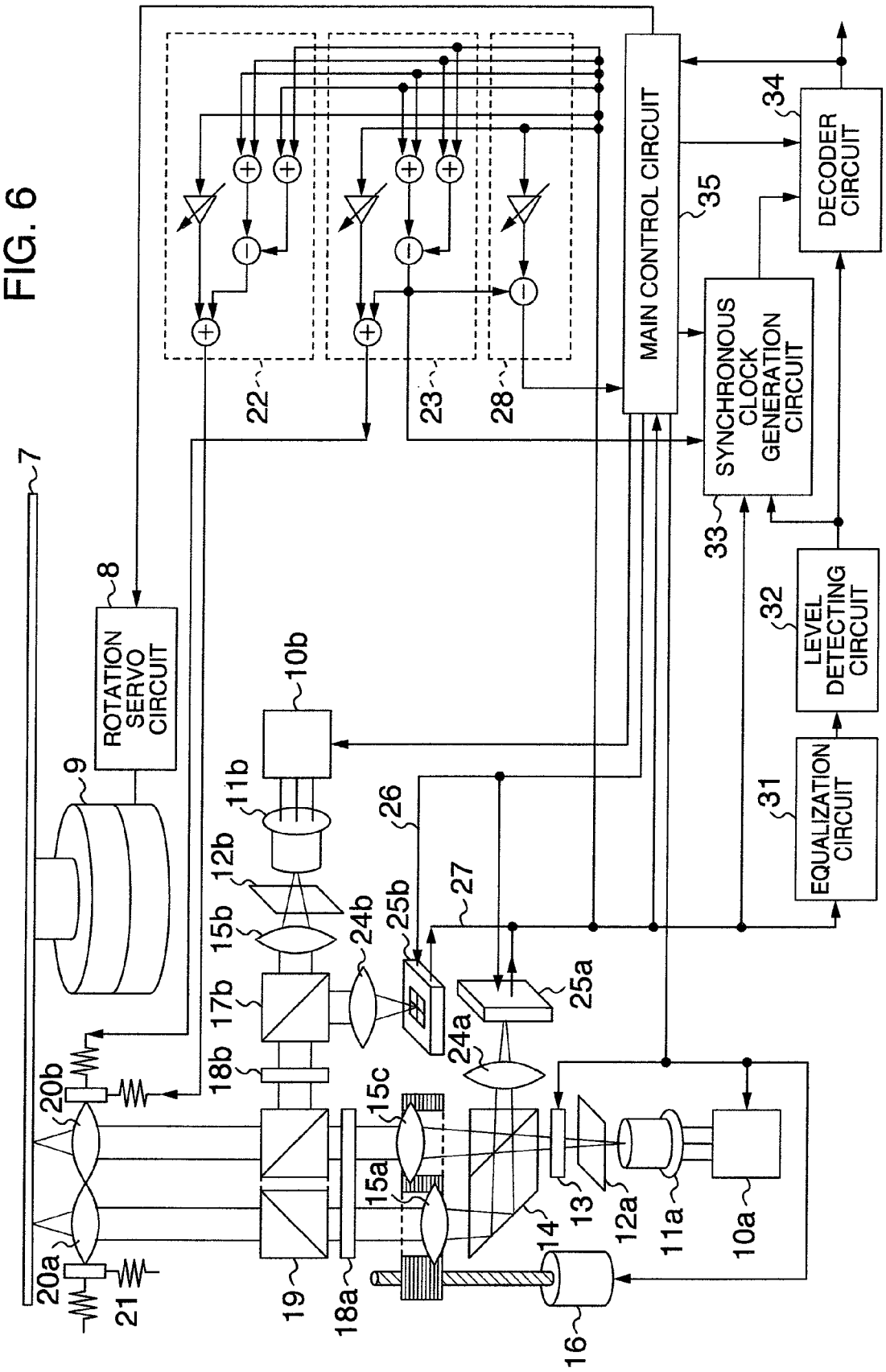
FIG. 6 is an example of the overall configuration of the information reproduction apparatus according to the present invention.

First, the overall configuration is described using FIG. 6.

An optical disc 7 which is a recording medium is mounted onto a motor 9, the rotational speed of which is controlled by a rotation servo circuit 8. This medium is irradiated with light from semiconductor lasers 11a and 11b which are driven by laser drive circuits 10a and 10b. The semiconductor lasers 11a and 11b are semiconductor lasers having different wavelengths respectively, wherein the semiconductor laser 11a is a blue semiconductor laser and the semiconductor laser 11b is a red/infrared light semiconductor laser.

The light of the red/infrared light semiconductor laser 11b passes through a diffraction grating 12b used for the three-spot method, through a collimate lens 15b, through a beam splitter 17b, and through a λ/4 plate 18b, and is then reflected by a beam splitter 19b and condensed by an objective lens 20b, and is emitted to the optical disc 7 which is a recording medium. The objective lens 20b is mounted on an actuator 21, wherein the focus position can be driven in the depth-of-focus direction (focus direction) by the signal of a focus servo circuit 22 and in the track direction by the signal of a tracking servo circuit 23, respectively. A part of the emitted light is reflected by the disc 7 and passes through the objective lens 20b again, and is then reflected by the beam splitter 19 and passes through the λ/4 plate 18b, and is reflected by the beam splitter 17b, and this time the reflected light passes through a detection lens 24b and is detected in a detector plane on a light receiving element 25b, and is converted into an electric signal. Note that, although the beam splitter 19 is divided into two components on FIG. 6, these are actually a coupled-integral optical component.

The light of the blue semiconductor laser 11a passes through a diffraction grating 12a used for the three-spot method, and through a polarization switching element 13 which controls the polarization direction, and enters a trapezoid polarization beam splitter 14 which is a luminous flux dividing element. Inside the polarization beam splitter 14, the transmission/reflection in a 45 degree reflection plane is determined in accordance with the polarization direction. The light which transmitted through the 45 degree reflection plane inside the polarization beam splitter 14 directly travels toward a collimate lens 15c. On the other hand, the light reflected by the 45 degree reflection plane inside the polarization beam splitter 14 travels toward a collimate lens 15a. The collimate lenses 15a and 15c are coupled together and held on a movable part of a lens driving mechanism, and this movable part can move in the direction parallel to the optical axis by means a stepping motor 16.

The light which passed through the collimate lenses 15a and 15c, respectively, passes through a λ/4 plate 18a, and through beam splitter 19, and then is condensed by objective lenses 20a and 20b, and is emitted to the optical disc 7 which is the recording medium. A part of the emitted light is reflected by the disc 7 and passes through the objective lenses 20a and 20b again, through the beam splitter 19, through the λ/4 plate 18a, and through the collimate lenses 15a and 15c, and then enters the trapezoid polarization beam splitter 14. In this case, since the respective beams of light have passed through the λ/4 plate 18a twice and accordingly the polarization thereof is rotated by 90 degrees, this time the light which passed through the collimate lens 15a transmits through the polarization beam splitter 14, and the light which passed through the collimate lens 15c is reflected by the polarization beam splitter 14, and the both beams of light travel toward the detection lens 24a. The light which passed through the detection lens 24a is detected in the detector plane on the light receiving element 25a and is converted into an electric signal.

The light receiving element control signal line 26 including the mode switching signal line, the address selection line, and the sensitivity switching signal line transmits the switching signal as shown in FIG. 8 in response to the switching between the recording/reproducing mode and the adjustment mode, the sensitivity switching, and the address selection (switching), and controls the light receiving elements 25a and 25b. These switching signals are supplied to each input signal terminal of the light receiving element shown in FIG. 1. In this case, for the signal input and the signal output of the light receiving element 25b, by making the setting common to that of FIG. 5, the connection of the light receiving element 25a and the connection of the signal line can be combined, as shown in FIG. 7, for example. Note that, as the light receiving element 25b, the light receiving surface of an ordinary light receiving element used for the three-spot method as shown in FIG. 3 is assumed to be used. As the light receiving surface on the light receiving element 25, the focus error is detected using an astigmatic method in this example. Moreover, in order to address this, a compound lens of a concave lens and a cylindrical lens is used as the detection lenses 24a and 24b.

The electric signals converted on these light receiving elements 25a and 25b are amplified by a photocurrent amplifier inside the respective light receiving elements, and are output from each output signal terminal of the light receiving element shown in FIG. 1, and are then supplied to a focus error signal generating circuit 22, a tracking error signal generating circuit 23, a lens error signal generating circuit 28, and a main control circuit 35 through light receiving element output signal lines 27. By adding and subtracting based on these signals, the focus error signal is generated in the focus error signal generating circuit 22, the tracking error signal is generated in the tracking error signal generating circuit 23, and the lens error signal is generated in the lens error signal generating circuit 28. Note that, for the light receiving element 25b, the signal at a signal terminal whose polarity is opposite to that of the light receiving element 25a is used as a light-receiving element output enable signal. In this way, all the signal lines of the light receiving element control signal line 26 and the light receiving element output signal lines 27 including the light-receiving element output enable signal are shared.

The reproduced signal is converted to the originally recorded digital signal in a decoder circuit 34 through an equalization circuit 31, a level detecting circuit 32, and a synchronous clock generation circuit 33. Moreover, at the same time, the synchronous clock generation circuit 33 directly detects a combined reproduced signal, generates a synchronizing signal, and supplies this to the decoder circuit 34. These series of circuits are comprehensively controlled by a main control circuit 35.

That is, in this configuration, the optical pickup described in Embodiment 1 is mounted on the driving unit, wherein the switching between the recording/reproducing mode and the adjustment mode, the sensitivity switching, and the address selection are carried out, and then the signal of an individual light-receiving surface which is output from the light receiving element is detected in the main control circuit to observe a change in the signal of each light-receiving surface under servo control, and thereby the optimum servo control can be carried. Accordingly, particularly in a driving unit corresponding to a multilayer optical disc, the adjustment as the whole driving unit (information reproduction apparatus) can be optimized, and the reliability as the whole apparatus will be improved.

Moreover, in this configuration, switching signal lines for a plurality of light receiving elements are provided and a plurality of light receiving elements includes the adjustment mode, respectively, and are connected in parallel to each other. Accordingly, the signal lines can be shared among a plurality of light receiving elements, and thereby the number of signal lines can be reduced further and the multiple-standards compatible optical disc driving apparatus can be miniaturized.

As apparent from the above description, the optical pickup of the above embodiments can use a transmission cable having a narrower width, thereby improving the drive performance. Then, the flexibility of the cable for connecting between the optical pickup and the circuit board of the drive fixing portion can be secured, and the durability against the reciprocating motion of the pickup will be also improved. Moreover, a connector having fewer number of terminals can be used, thus achieving high reliability. Moreover, noise generation during reproduction can be prevented, and thus the transmission performance can be improved even when a connector having the same number of terminals is used. This is because impedance matching can be easily achieved if there is a margin in the number of lines. Moreover, the transmission performance can be improved and faster data transfer (high-speed reading/writing) can be carried out. With regard to noise characteristic, the same characteristic having no deterioration as compared with the conventional one can be obtained.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup, comprising:
a laser light source which emits a laser beam;
an objective lens which focuses a laser beam onto a recording layer of an optical disc; and
a light receiving element which receives an optical signal modulated by the recording layer, wherein the light receiving element includes
a first mode capable of making address selection of a signal of an individual light-receiving surface, instead of fixing a sensitivity (gain), and outputting the same and a second mode capable of selecting the sensitivity instead of fixing the signal selection of an individual light-receiving surface, and
the light receiving element further includes a sensitivity switching signal line and a switching signal line for switching to the first mode, wherein an address selection signal line of the individual light-receiving surface in the first mode is used also as the sensitivity switching signal line.

2. The optical pickup according to claim 1, wherein the light receiving element comprises a latch circuit, which holds a sensitivity setting prior to switching, as it is, during mode switching to the first mode by means of the switching signal line.

3. The optical pickup according to claim 1, wherein the optical pickup corresponds to a multilayer optical disc having multiple recording layers, and wherein the light receiving element has no less than 14 light receiving surfaces.

4. The optical pickup according to claim 1, further comprising switching signal lines for a plurality of light receiving elements, wherein the plurality of light receiving elements have a function for the first mode, respectively.

5. The optical pickup according to claim 1, further comprising an output terminal, which differentially outputs a signal of the individual light-receiving surface, the signal being output by the address selection.

6. The optical pickup according to claim 1, wherein the light receiving element comprises an operational circuit which calculates a sub tracking error signal and a sub focus error signal.

7. The optical pickup according to claim 6, wherein the light receiving element outputs the sub light-receiving surface focus error signal and the sub light-receiving surface tracking error signal also when switching to the first mode.

8. The optical pickup according to claim 1, wherein a signal of a divided light-receiving surface on a main spot can be output by the address selection signal line.

9. An optical disc driving apparatus, comprising:
a motor which rotates an optical disc;
an optical pickup which emits a laser beam to the optical disc and detects a laser beam reflected by the optical disc; and
a rotation servo unit which controls a rotational speed of the motor based on an output from the optical pickup, wherein the optical pickup comprises:
a laser light source which emits a laser beam,
an objective lens which focuses the laser beam onto a recording layer of an optical disc; and
a light receiving element which receives an optical signal modulated by the recording layer, wherein
the light receiving element has a sensitivity switching function, and includes an operation mode capable of making address selection of a signal of an individual light-receiving surface while holding the selection of a sensitivity in the sensitivity switching, and outputting the same, and wherein
the light receiving element further comprises a sensitivity switching signal line which carries out the sensitivity switching, and a switching signal line for switching to the operation mode, wherein an address selection signal line which makes address selection of a signal of the individual light-receiving surface is used also as the sensitivity switching signal line.

* * * * *